(12) United States Patent
Love et al.

(10) Patent No.: US 11,366,795 B2
(45) Date of Patent: Jun. 21, 2022

(54) SYSTEM AND METHOD FOR GENERATING BITMAPS OF METADATA CHANGES

(71) Applicant: EMC IP Holding Company, LLC, Hopkinton, MA (US)

(72) Inventors: Philip Love, San Jose, CA (US); Vladimir Shveidel, Pardes-Hana (IL); Bar David, Rishon Lezion (IL)

(73) Assignee: EMC IP HOLDING COMPANY, LLC, Hopkinton, MA (US)

(*) Notice: Subject to any disclaimer, the term of this patent is extended or adjusted under 35 U.S.C. 154(b) by 303 days.

(21) Appl. No.: 16/667,032

(22) Filed: Oct. 29, 2019

(65) Prior Publication Data

US 2021/0124725 A1    Apr. 29, 2021

(51) Int. Cl.
*G06F 16/22* (2019.01)
(52) U.S. Cl.
CPC .............................. *G06F 16/2237* (2019.01)
(58) Field of Classification Search
CPC .................................................. G06F 16/2237
USPC ................................................................ 707/745
See application file for complete search history.

(56) References Cited

U.S. PATENT DOCUMENTS

| | | | | |
|---|---|---|---|---|
| 9,766,990 | B1* | 9/2017 | Michaud | G06F 11/1458 |
| 2008/0155342 | A1* | 6/2008 | O'Callahan | G06F 11/3636 |
| | | | | 714/38.14 |
| 2010/0070678 | A1* | 3/2010 | Zhang | G06F 9/45558 |
| | | | | 711/6 |
| 2013/0091322 | A1* | 4/2013 | Wang | G06F 12/0246 |
| | | | | 711/E12.008 |
| 2017/0032005 | A1* | 2/2017 | Zheng | G06F 16/128 |
| 2017/0357550 | A1* | 12/2017 | Jain | G06F 11/1451 |
| 2019/0179538 | A1* | 6/2019 | van Riel | G06F 3/0641 |
| 2019/0370238 | A1* | 12/2019 | Luo | G06F 3/064 |
| 2020/0104261 | A1* | 4/2020 | Oh | G06F 12/0882 |

* cited by examiner

*Primary Examiner* — Hares Jami
(74) *Attorney, Agent, or Firm* — Brian J. Colandreo; Mark H. Whittenberger; Holland & Knight LLP

(57) ABSTRACT

A method, computer program product, and computing system for identifying an operation performed on a metadata page of a plurality of metadata pages within a storage system. A bitmap indicating one or more portions of a plurality of portions of the metadata page the operation is performed on may be generated. The bitmap may be stored within the storage system.

15 Claims, 10 Drawing Sheets

SYSTEM AND METHOD FOR GENERATING BITMAPS OF METADATA CHANGES

BACKGROUND

Storing and safeguarding electronic content may be beneficial in modern business and elsewhere. Accordingly, various methodologies may be employed to protect and distribute such electronic content.

For example, conventional approaches to maintaining changes to metadata pages in a storage system require the storing of an entire metadata page to a metadata log that includes changes resulting from an operation performed on a metadata page. This approach may be computationally inefficient by storing entire metadata pages of metadata changes or deltas; especially for operations that only require minor changes to a metadata page.

SUMMARY OF DISCLOSURE

In one example implementation, a computer-implemented method executed on a computing device may include, but is not limited to, identifying an operation performed on a metadata page of a plurality of metadata pages within a storage system. A bitmap indicating one or more portions of a plurality of portions of the metadata page the operation is performed on may be generated. The bitmap may be stored within the storage system.

One or more of the following example features may be included. The bitmap may be generated for each type of operation performed on the metadata page. Each bit of the bitmap may indicate a portion of the metadata page the operation is performed on. Each bit of the bitmap may indicate a portion of the metadata page the operation is not performed on. The operation may include merging a child metadata page and a parent metadata page of a snapshot. The bitmap may indicate one or more portions of the plurality of portions of the child metadata page changed from a data copy indicator to a data source indicator. The metadata page may be reconstructed based upon, at least in part, the bitmap stored within the storage system.

In another example implementation, a computer program product resides on a computer readable medium that has a plurality of instructions stored on it. When executed by a processor, the instructions cause the processor to perform operations that may include, but are not limited to, identifying an operation performed on a metadata page of a plurality of metadata pages within a storage system. A bitmap indicating one or more portions of a plurality of portions of the metadata page the operation is performed on may be generated. The bitmap may be stored within the storage system.

One or more of the following example features may be included. The bitmap may be generated for each type of operation performed on the metadata page. Each bit of the bitmap may indicate a portion of the metadata page the operation is performed on. Each bit of the bitmap may indicate a portion of the metadata page the operation is not performed on. The operation may include merging a child metadata page and a parent metadata page of a snapshot. The bitmap may indicate one or more portions of the plurality of portions of the child metadata page changed from a data copy indicator to a data source indicator. The metadata page may be reconstructed based upon, at least in part, the bitmap stored within the storage system.

In another example implementation, a computing system includes at least one processor and at least one memory architecture coupled with the at least one processor, wherein the at least one processor may be configured to identify an operation performed on a metadata page of a plurality of metadata pages within a storage system. The at least one processor may be further configured to generate a bitmap indicating one or more portions of a plurality of portions of the metadata page the operation is performed on. The at least one processor may be further configured to store the bitmap within the storage system.

One or more of the following example features may be included. The bitmap may be generated for each type of operation performed on the metadata page. Each bit of the bitmap may indicate a portion of the metadata page the operation is performed on. Each bit of the bitmap may indicate a portion of the metadata page the operation is not performed on. The operation may include merging a child metadata page and a parent metadata page of a snapshot. The bitmap may indicate one or more portions of the plurality of portions of the child metadata page changed from a data copy indicator to a data source indicator. The metadata page may be reconstructed based upon, at least in part, the bitmap stored within the storage system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
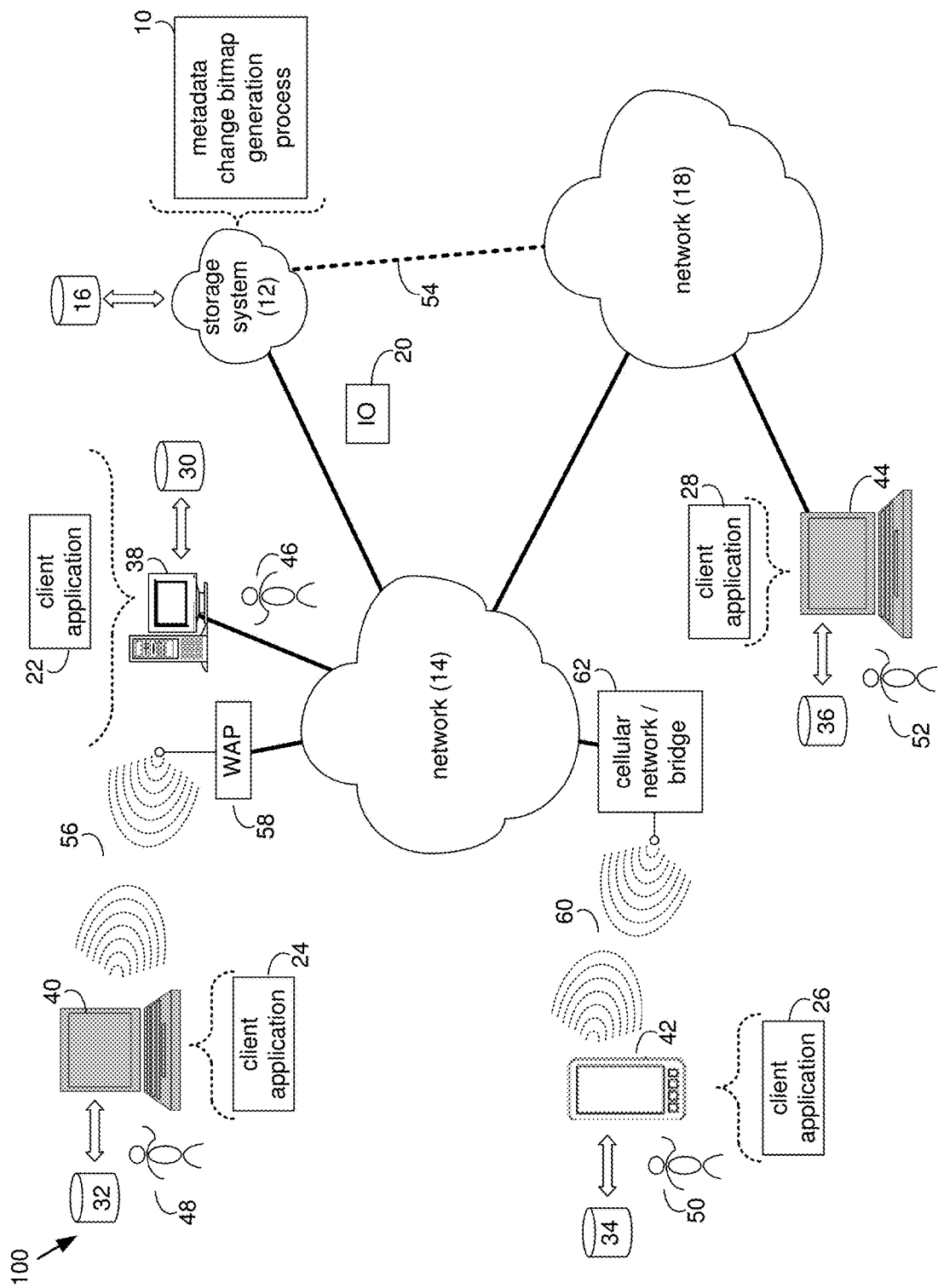
FIG. 1 is an example diagrammatic view of a storage system and a metadata change bitmap generation process coupled to a distributed computing network according to one or more example implementations of the disclosure.

System Overview:

Referring to FIG. 1, there is shown metadata change bitmap generation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata change bitmap generation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of metadata change bitmap generation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a metadata change bitmap generation process, such as metadata change bitmap generation process 10 of FIG. 1, may include but is not limited to, identifying an operation performed on a metadata page of a plurality of metadata pages within a storage system. A bitmap indicating one or more portions of a plurality of portions of the metadata page the operation is performed on may be generated. The bitmap may be stored within the storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
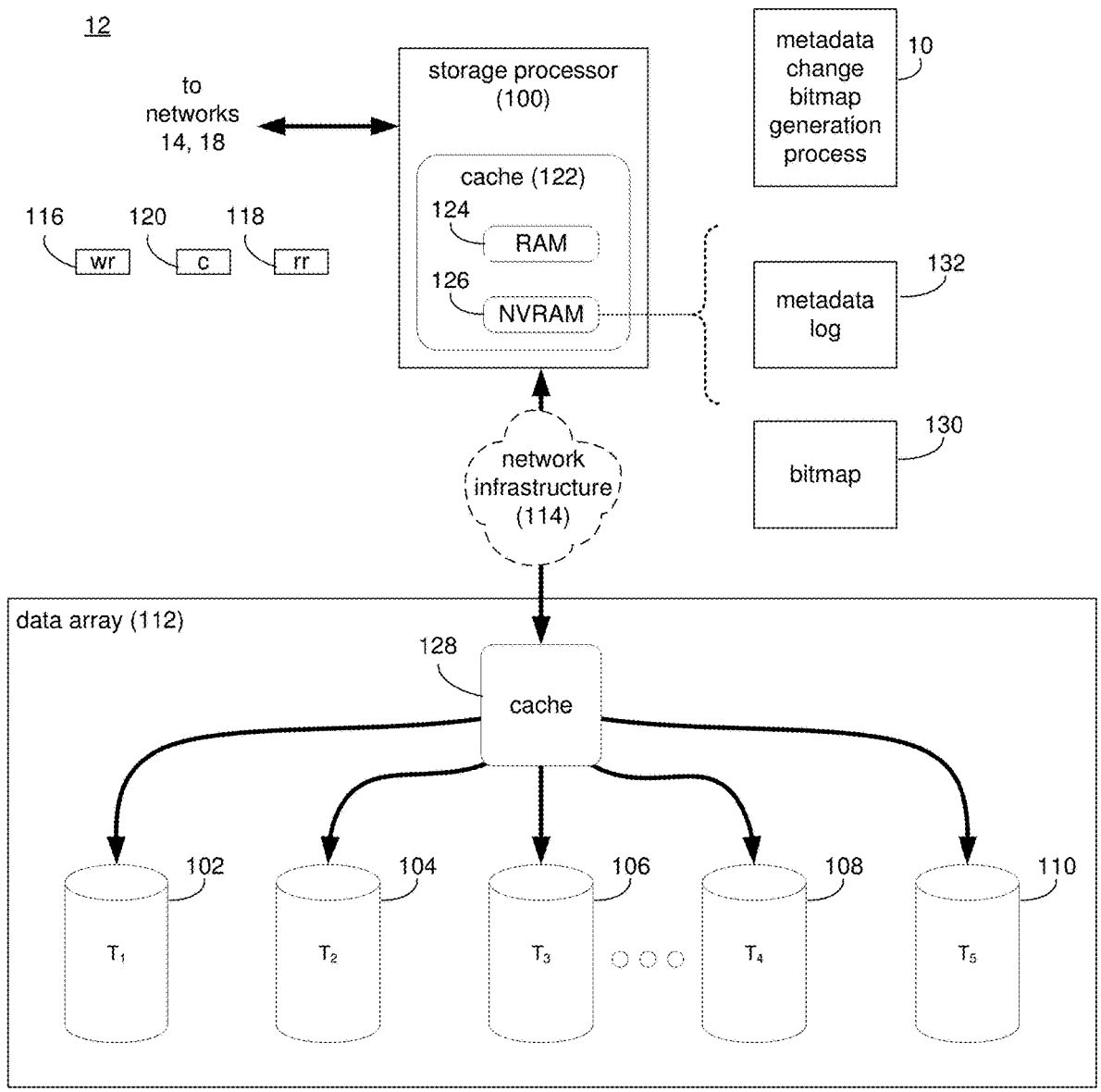
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of metadata change bitmap generation process 10. The instruction sets and subroutines of metadata change bitmap generation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of metadata change bitmap generation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system 124) and/or a non-volatile, solid-state, cache memory system (e.g., a flash-based, cache memory system 126).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 128. Examples of backend cache memory system 128 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 128 prior to being stored on e.g. one or more of storage targets 102, 104, 106, 108, and coded target 110.

As discussed above, the instruction sets and subroutines of metadata change bitmap generation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata change bitmap generation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 128 prior to being stored on e.g. one or more of storage targets 102, 104, 106, 108, 110. Accordingly, during use of data array 112, backend cache memory system 128 may be populated (e.g., warmed) and, therefore, subsequent read requests may be satisfied by backend cache memory system 128 (e.g., if the content requested in the read request is present within backend cache memory system 128), thus avoiding the need to obtain the content from storage targets 102, 104, 106, 108, 110 (which would typically be slower).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
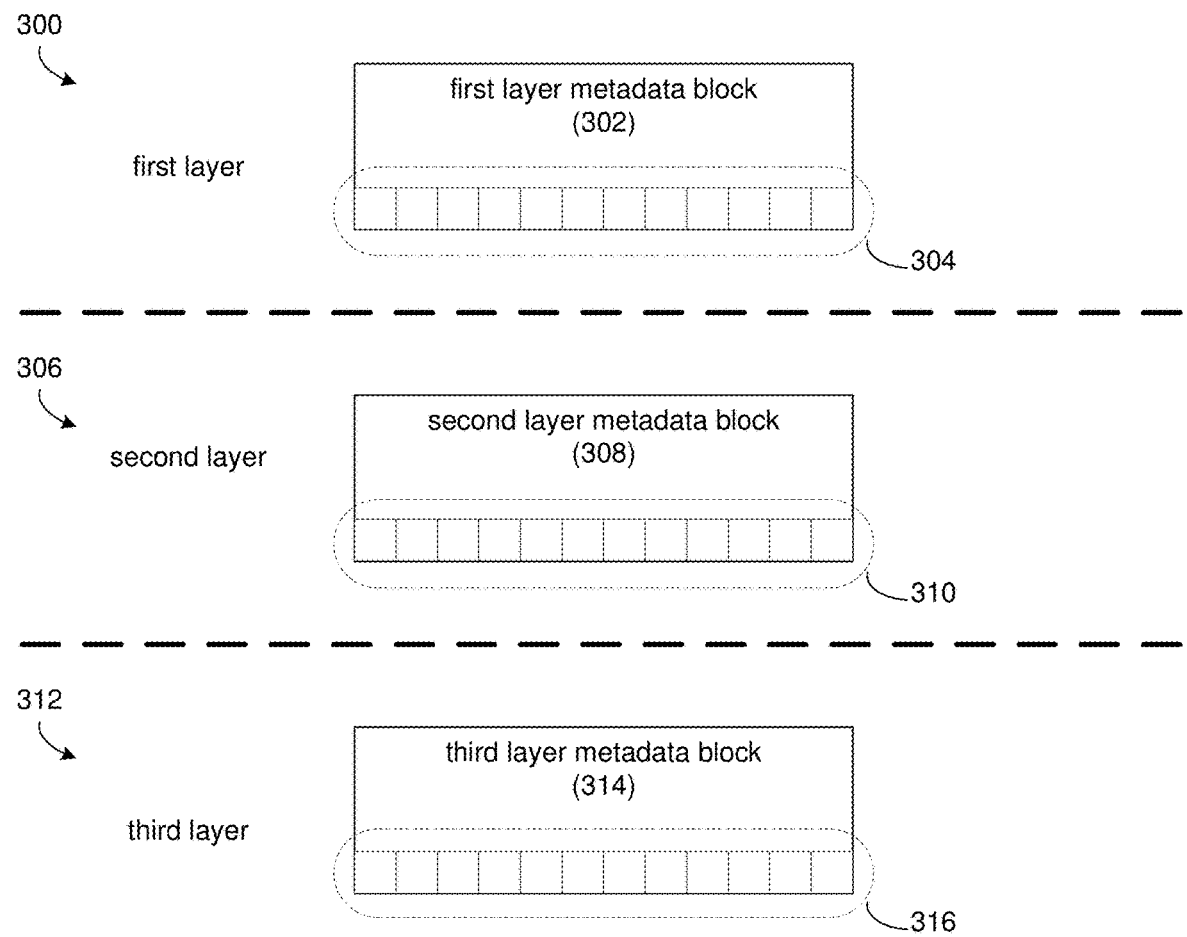
Figure 4:
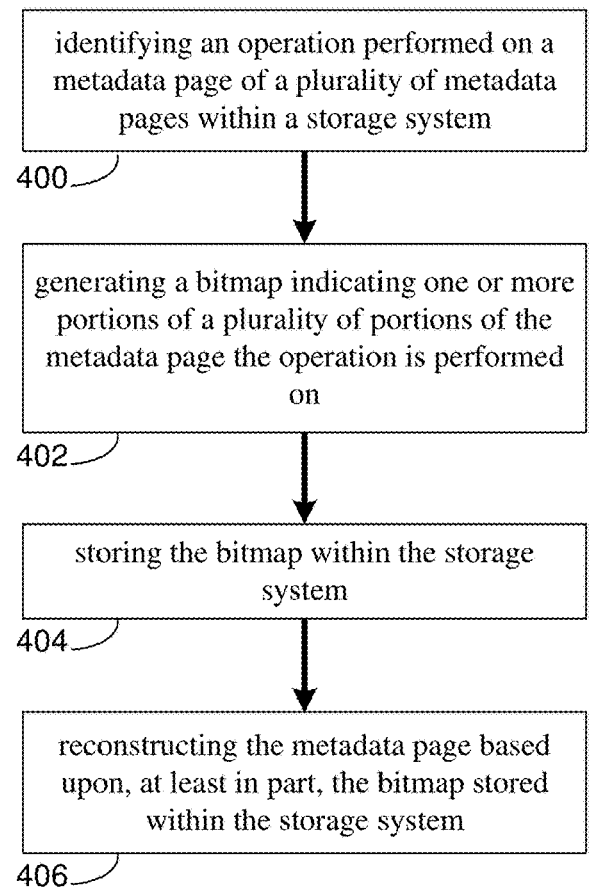
FIG. 4 is an example flowchart of the metadata change bitmap generation process of FIG. 1 according to one or more example implementations of the disclosure.
Figure 5:
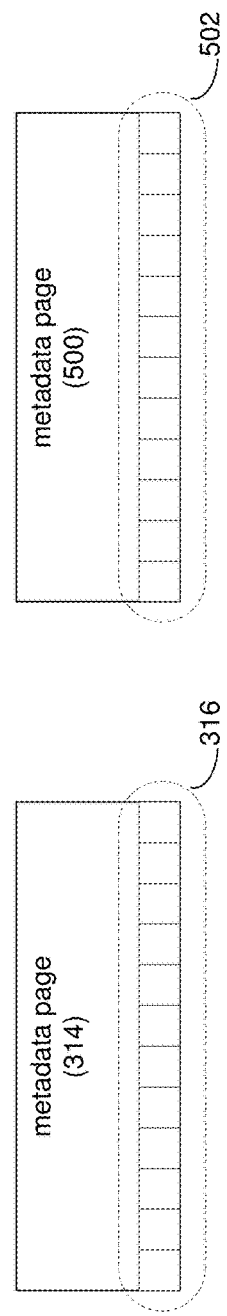
FIGS. 5-10 are example diagrammatic views of the metadata change bitmap generation process of FIG. 1 according to one or more example implementations of the disclosure.

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer (e.g., first layer 300) may represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one.

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may also be referred to as a metadata page and may have a predefined amount of storage capacity (e.g., 4 kilobytes) for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

The Metadata Change Bitmap Generation Process:

Referring also to FIGS. 4-10 and in some implementations, metadata change bitmap generation process 10 may identify 400 an operation performed on a metadata page of a plurality of metadata pages within a storage system. A bitmap indicating one or more portions of a plurality of portions of the metadata page the operation is performed on may be generated 402. The bitmap may be stored 404 within the storage system.

As will be discussed in greater detail below, embodiments of the present disclosure may allow for a simple and safe reconstruction of metadata pages when applying the entries of a metadata log. For example, instead of saving an entire metadata page to a metadata or delta log that includes changes resulting from an operation performed on a metadata page, metadata change bitmap generation process 10 may generate and store a bitmap indicating which portions of the metadata page the operation is or was performed on. Accordingly, when portions of the metadata page have been altered, metadata change bitmap generation process 10 may only store an equivalent number of bytes in the metadata log or delta log within the storage system. In this manner, metadata change bitmap generation process 10 may improve the storage efficiency of a metadata log by generating and storing bitmaps that require significantly less memory to store than a metadata page.

In some implementations, metadata change bitmap generation process 10 may identify 400 an operation performed on a metadata page of a plurality of metadata pages within a storage system. Referring also to the example of FIG. 5 and in some implementations, storage system 12 may include a plurality of metadata pages (e.g., metadata pages 314, 500). As discussed above and in some implementations, each metadata page (e.g., metadata pages 314, 500) may include a plurality of entries or portions configured to store user data (e.g., plurality of entries 316, 502). In some implementations and as discussed above, storage system 12 may receive various IO requests (e.g., from client applications 22, 24, 26, 28) for reading data from and/or writing data to storage system 12. In some implementations, reading data from and/or writing data to the plurality of metadata pages (e.g., metadata pages 314, 500) may include performing one or more user IO operations on the plurality of metadata pages (e.g., metadata pages 314, 500). In some implementations, storage system 12 may perform one or more background operations on the plurality of metadata pages (e.g., metadata pages 314, 500). Accordingly, it will be appreciated that various operations may be performed on the plurality of metadata pages (e.g., metadata pages 314, 500) in response to user IO and/or background operations of storage system 12. In some implementations and in response to metadata change bitmap generation process 10 performing the operation on the metadata page, metadata change bitmap generation process 10 may identify 400 the operation performed on the metadata page. As will be discussed in greater detail below, metadata change bitmap generation process 10 may minimize the amount of data stored in a metadata log or delta log following each operation performed on a metadata page.

In some implementations, the operation may include merging a child metadata page and a parent metadata page of a snapshot. Referring also to the example of FIG. 6 and in some implementations, a pair of metadata pages (e.g., metadata pages 314, 500) may originate as a parent-child pair, where the child (e.g., metadata page 500) is created as a copy from the parent (e.g., metadata page 314) after a snapshot has occurred. This operation may include metadata change bitmap generation process 10 copying each of the entries from the parent (e.g., metadata page 314) to the child (e.g., metadata page 500), but metadata change bitmap generation process 10 may set a COPY flag on each entry for the child (e.g., each entry of the plurality of entries 502 is labeled as "C" to represent a COPY flag of metadata page 500 indicating that the plurality of entries 502 are a copy of the user data) and may set a SOURCE flag on each entry of the parent (e.g., each entry of the plurality of entries 316 is labeled as "S" to represent a SOURCE flag of metadata page 314 indicating that the plurality of entries 316 are the source of the user data). Accordingly, after a snapshot operation, each entry (e.g., plurality of entries 502) of a child metadata page (e.g., metadata page 500) may have a COPY flag set indicating that each entry is a copy of a corresponding entry (e.g., plurality of entries 316) in a parent metadata page (e.g., metadata page 314).

Figure 7:
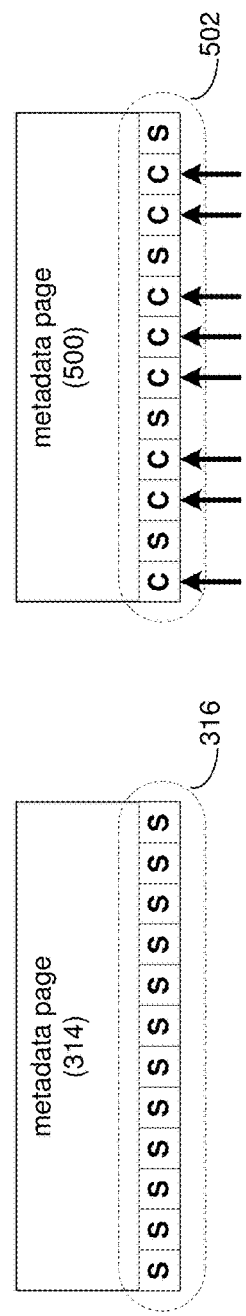
Figure 8:
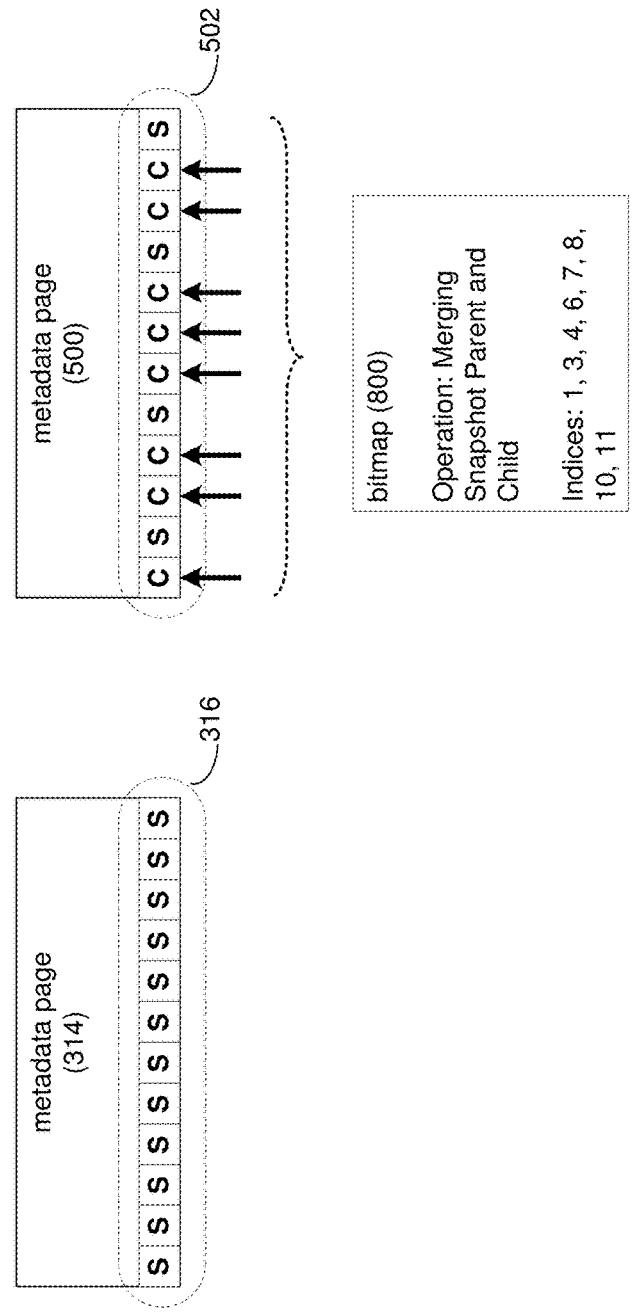
Figure 9:
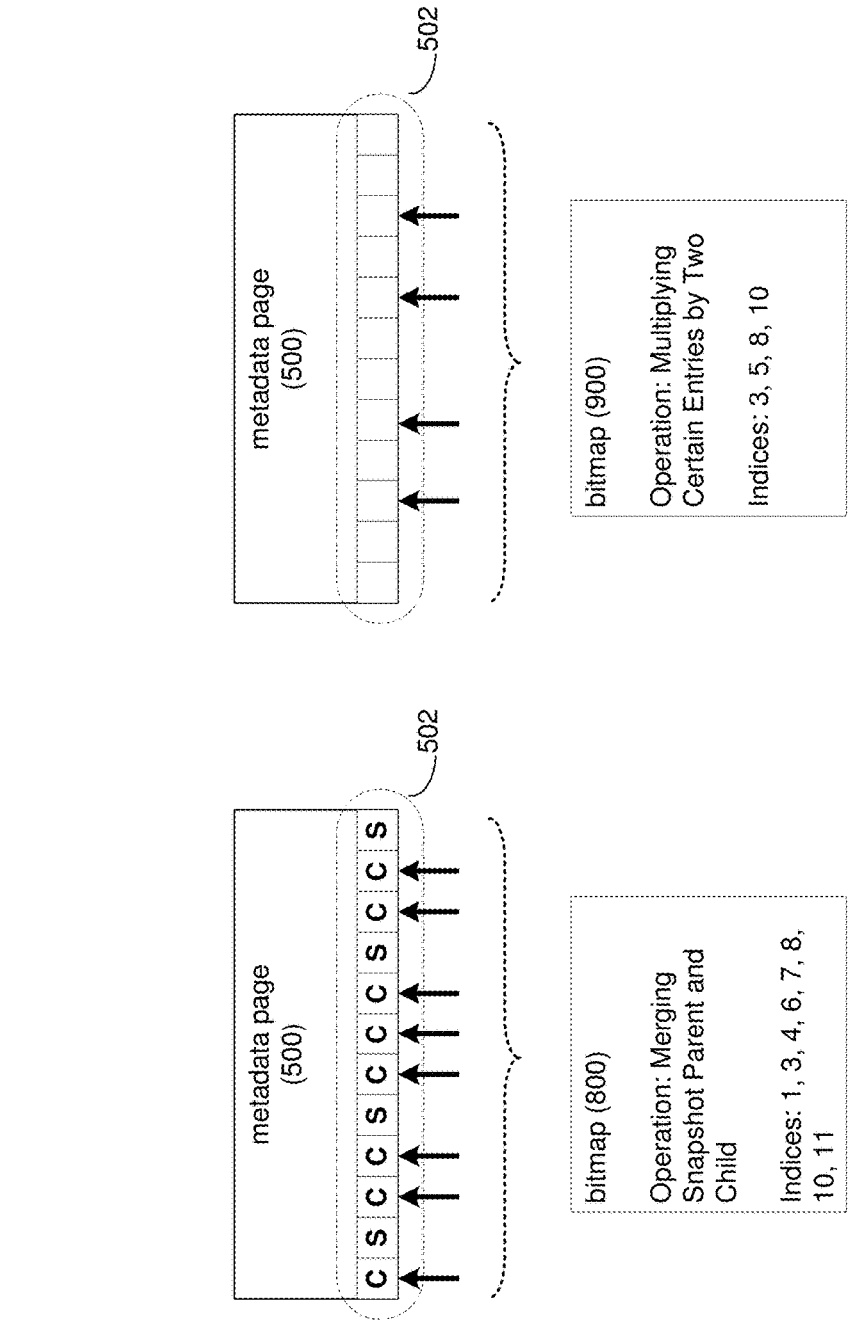
Figure 10:
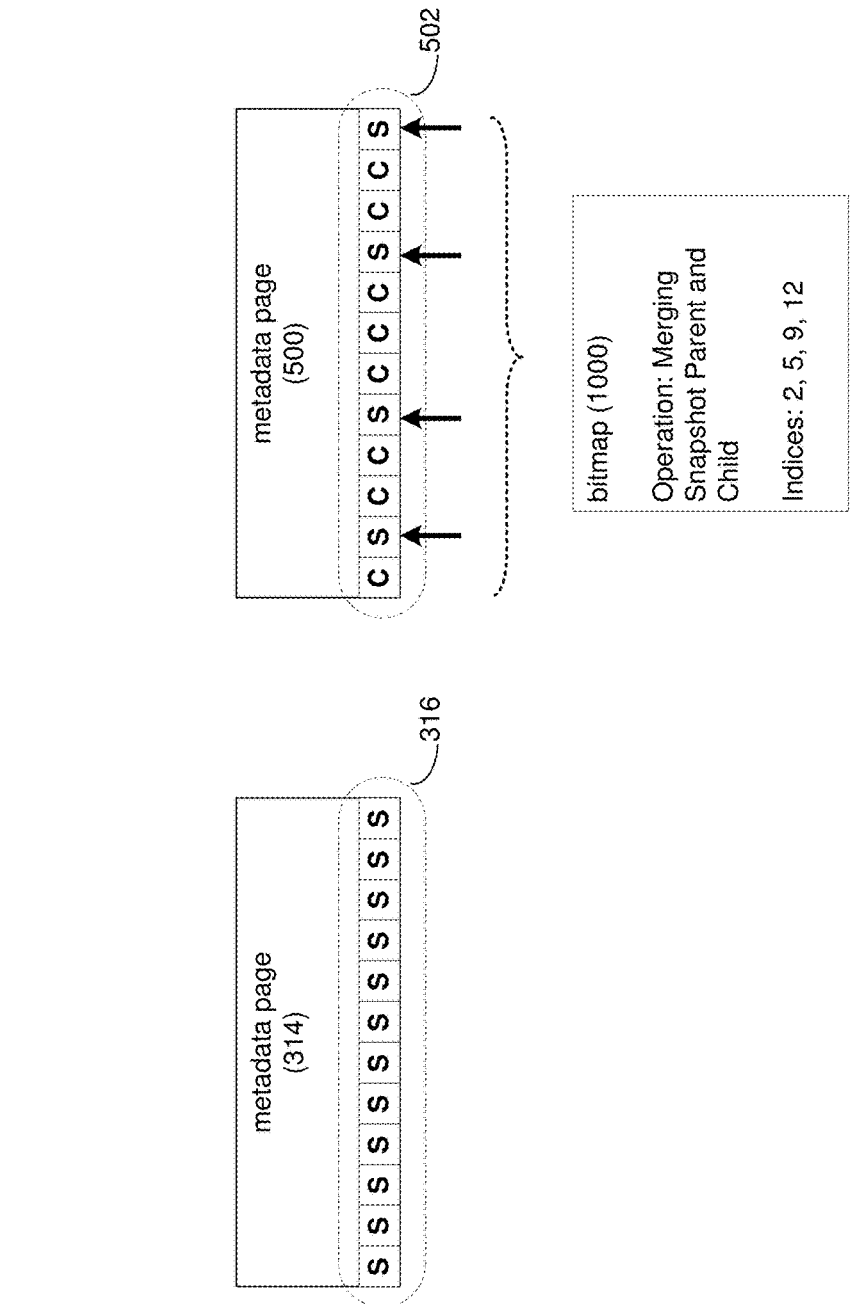

In some implementations, as further operations are performed on the plurality of metadata pages, a user and/or storage system 12 may desire to remove the snapshot. In this example of a snapshot removal operation, the parent metadata page may no longer be needed. Accordingly, the operation may include merging a child metadata page and a parent metadata page of a snapshot. Referring also to the example of FIG. 7 and in some implementations, the child metadata page (e.g., metadata page 500) may include two types of entries, firstly COPY entries that were copied from the parent when the snapshot was created, and secondly SOURCE entries, which may correspond to new writes to the metadata page after the snapshot was taken. Therefore as metadata change bitmap generation process 10 executes the merging operation, if metadata change bitmap generation process 10 encounters an entry on the parent metadata page (e.g., metadata page 314) with a SOURCE flag and a corresponding entry on the child metadata page (e.g., metadata page 500) with a COPY flag, then metadata change bitmap generation process 10 may switch these two flags. In the example of FIG. 7, metadata change bitmap generation process 10 may identify 400 each entry in the child metadata page (e.g., metadata page 500) with a COPY flag (e.g., as shown with the plurality of arrows).

Figure 6:
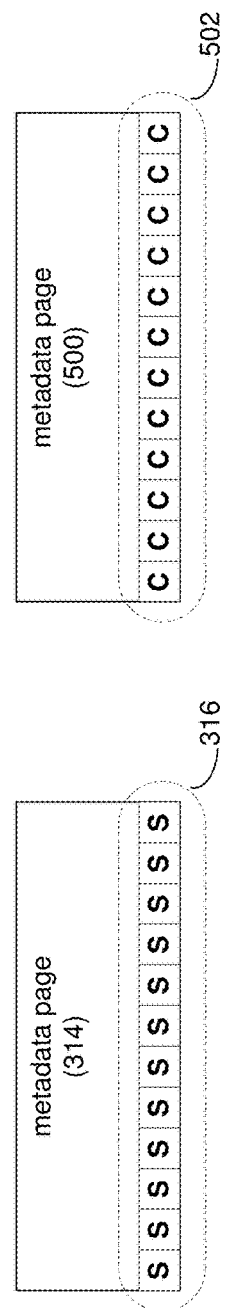

While the above examples of FIGS. 6-7 may relate to a merging operation performed as part of a snapshot removal process, it will be appreciated that metadata change bitmap generation process 10 may perform and identify 400 the various operations performed on the plurality of metadata pages within the scope of the present disclosure. For example, other operations that may be performed and identified 400 may generally include, copying operations (e.g., copying of data from entries from one metadata page to another metadata page), arithmetic operations (e.g., performing a calculation on numerical data from entries of a metadata page (e.g., adding a value to an entry, subtracting a value from an entry, etc.)), deletion operations (e.g., emptying one or more entries), etc.

In some implementations, metadata change bitmap generation process 10 may generate 402 a bitmap indicating one or more portions of a plurality of portions of the metadata page the operation is performed on. Referring also to the example of FIG. 2 and in some implementations, metadata change bitmap generation process 10 may generate 402 a bitmap (e.g., bitmap 800) that indicates one or more portions of a plurality of portions of the metadata page the operation is performed on. As will be discussed in greater detail below, bitmap 130 may be stored 404 within the storage system (e.g., in metadata log 132 within NVRAM 126). As bitmap 130 may indicate the portions of a metadata page that an operation is performed on, bitmap 130 may be used when reconstructing 406 the plurality of metadata pages. In some implementations, bitmap 130 may be a predefined size (e.g., 64 bytes) with a predefined number of entries (e.g., 512 entries). However, it will be appreciated that any bitmap size and number of entries may be used within the present disclosure. In some implementations, each entry of bitmap 130 may correspond to a portion or entry of a metadata page. In this manner, a set bit in bitmap 130 may indicate (as will be discussed in greater detail below) which portions of the metadata page the operation is or was performed on. However, it will be appreciated that bitmap 130 may have more entries than the metadata page or fewer entries than the metadata page.

In some implementations, each bit of the bitmap may indicate a portion of the metadata page the operation is performed on. Referring also to the example of FIG. 8 and in some implementations, metadata change bitmap generation process 10 may generate 402 bitmap 800 indicating which portions of metadata page 500 to perform the merging operation on (e.g., changing COPY flags of metadata page 500 to SOURCE flags). In this example, bitmap 800 may indicate that portions or indices e.g., 1, 3, 4, 6, 7, 8, 10, and 11 have had their COPY flag changed or switched to a SOURCE flag. As discussed above and in some implementations, bitmap 800 may include an entry for each entry of metadata page 500 such that a bit may be set for indices e.g., e.g., 1, 3, 4, 6, 7, 8, 10, and 11 to indicate that these corresponding entries of the metadata page have had their COPY flag changed or switched to a SOURCE flag. Accordingly and in some implementations, bitmap 800 may indicate one or more portions of the plurality of portions of the metadata page 500 changed from a data copy indicator (e.g., COPY flag) to a data source indicator (e.g., SOURCE flag).

In some implementations, the bitmap may be generated for each type of operation performed on the metadata page. Referring also to the example of FIG. 9 and in some implementations, metadata change bitmap generation process 10 may (as discussed above) identify 400 a first type of operation (e.g., a merging operation (e.g., changing COPY flags to SOURCE flags) as part of a snapshot removal process) performed on a metadata page (e.g., metadata page 500) and may generate 402 a bitmap (e.g., bitmap 800) indicating which portions of the metadata page the identified operation is or was performed on. In this example, bitmap 800 may indicate that entries or indices e.g., 1, 3, 4, 6, 7, 8, 10, and 11 of metadata page 500 had the operation performed on them (e.g., changing COPY flags to SOURCE flags). Similarly and in some implementations, metadata change bitmap generation process 10 may identify 400 a second type of operation (e.g., an arithmetic operation (e.g., multiplying a subset of entries by e.g., two)) performed on a metadata page (e.g., metadata page 500) and may generate 402 a bitmap (e.g., bitmap 900) indicating portions of the metadata page the identified operation is or was performed on. In this example, bitmap 900 may indicate that entries or indices e.g., 3, 5, 8, and 10 of metadata page 500 had the operation performed on them (e.g., multiplied by two). In some implementations, each type of operation may occur at different times (i.e., the merging operation may occur before the arithmetic operation). In this manner, metadata change bitmap generation process 10 may generate 402 a bitmap for each type of operation performed on a metadata page.

In some implementations, each bit of the bitmap may indicate a portion of the metadata page the operation is not performed on. Referring also to the example of FIG. 10 and in some implementations, metadata change bitmap generation process 10 may (as discussed above) identify 400 a merging operation (e.g., changing COPY flags to SOURCE flags) as part of a snapshot removal process performed on a metadata page (e.g., metadata page 500) and may generate 402 a bitmap (e.g., bitmap 1000) indicating which portions of the metadata page the identified operation is not or was not performed on. In this example, bitmap 1000 may indicate that entries or indices e.g., 2, 5, 9, and 12 of metadata page 500 did not have the operation performed on them (e.g., changing COPY flags to SOURCE flags). In this example and as can be seen from comparing the number of entries of each bitmap, bitmap 1000 may include fewer entries and as such consume less memory by indicating the portions of the metadata page the identified operation is not or was not performed on. In some implementations, bitmap 1000 may include only entries corresponding to the entries of metadata page 500 that the identified operation is not or was not performed on. In this example, bitmap 1000 may require e.g., only 1 byte per change to store the index. Accordingly and in some implementations, metadata change bitmap generation process 10 may generate 402 a bitmap with fewer corresponding entries than the metadata page.

In some implementations, metadata change bitmap generation process 10 may store 404 the bitmap within the storage system. Referring again to the example of FIG. 2 and in some implementations, metadata change bitmap generation process 10 may store bitmap 130 in metadata log 132 within storage system 12. In some implementations, metadata log 132 may generally store changes to metadata pages or deltas in time order (e.g., sorted oldest to newest). In some implementations, in the event of a power failure or other failure of the RAM (e.g., RAM 124) or other portions of storage system 12 including metadata pages, metadata change bitmap generation process 10 may recover the one or more metadata changes from the metadata log (e.g., metadata log 132). In some implementations, metadata changes or deltas may be stored in the metadata log as entire metadata pages (e.g., 4 kilobyte metadata pages). Therefore, even if changes to a metadata page only impact a portion of the metadata page, conventional approaches may store the metadata changes in an entire metadata page (e.g., to represent how the metadata page changed). In some implementations and as discussed above, metadata change bitmap generation process 10 may store 404 a bitmap (e.g., bitmap 130) with a number of entries corresponding to a number of entries in a metadata page to indicate which portions of the metadata page a particular operation is performed on. In this manner, metadata change bitmap generation process 10 may store 404 a significantly smaller bitmap instead of an entire metadata page to indicate how a metadata page changes in response to performing an operation on the metadata page. In one example, metadata change bitmap generation process 10 may store 404 a e.g., 512 entry bitmap which may only require e.g., 64 bytes compared with e.g., 4 kilobytes for an entire metadata page.

In some implementations, metadata change bitmap generation process 10 may reconstruct 406 the metadata page based upon, at least in part, the bitmap stored within the storage system. Referring again to the example of FIG. 9 and in some implementations, suppose metadata change bitmap generation process 10 performs one or more operations on metadata page 500 (e.g., while metadata page 500 is stored in RAM 124). For example, suppose metadata change bitmap generation process 10 first performs a snapshot removal process and merges parent metadata page 314 and child metadata page 500. As discussed above, metadata change bitmap generation process 10 may identify 400 the merging operation (e.g., changing COPY flags to SOURCE flags) as part of the snapshot removal process) performed on a metadata page (e.g., metadata page 500) and may generate 402 a bitmap (e.g., bitmap 800) indicating which portions of the metadata page the identified operation is or was performed on. In some implementations, metadata change bitmap generation process 10 may store 404 bitmap 800 within storage system 12 (e.g., within metadata log 132).

Further suppose that metadata change bitmap generation process 10 identifies 400 a second operation (e.g., an arithmetic operation (e.g., multiplying a subset of entries by e.g., two)) performed on the metadata page (e.g., metadata page 500) and generates 402 a bitmap (e.g., bitmap 900) indicating portions of the metadata page the identified arithmetic operation is or was performed on. In some implementations, metadata change bitmap generation process 10 may store 404 bitmap 900 within storage system 12 (e.g., within metadata log 132).

Now suppose RAM 124 of storage system 12 fails (e.g., in the event of a power failure or other failure), metadata change bitmap generation process 10 may reconstruct metadata page 500 based upon, at least in part, bitmaps 800 and 900 stored within storage system 12 (e.g., within metadata log 132). In this example, metadata change bitmap generation process 10 may reconstruct 406 metadata page 500 by processing each bitmap to determine which operations were performed on which portions of metadata page 500 without processing entire metadata pages of metadata changes. Rather, metadata change bitmap generation process 10 may reconstruct 406 metadata page 500 by reapplying deltas or metadata changes based upon, at least in part, the entries of bitmaps 800 and 900. In some implementations, metadata change bitmap generation process 10 may reapply deltas or metadata changes to either a child or a parent metadata page independently, without needing to examine both the parent and child metadata pages to recalculate the metadata changes. Accordingly, in this example, because the deltas are applied in time order, when applying the merge operation bitmap deltas of bitmap 800, metadata change bitmap generation process 10 may reconstruct 406 metadata page 500 by only setting the corresponding flags corresponding to the entries of bitmap 800.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   identifying, via the computing device, an operation performed on a metadata page of a plurality of metadata pages within a storage system, wherein the operation includes merging a child metadata page and a parent metadata page of a snapshot;
   generating a bitmap indicating one or more portions of a plurality of portions of the metadata page the operation is performed on, wherein the bitmap indicates one or more portions of the plurality of portions of the child metadata page changed from a data copy indicator to a data source indicator; and
   storing the bitmap within the storage system.

2. The computer-implemented method of claim 1, wherein the bitmap is generated for each type of operation performed on the metadata page.

3. The computer-implemented method of claim 1, wherein each bit of the bitmap indicates a portion of the metadata page the operation is performed on.

4. The computer-implemented method of claim 1, wherein each bit of the bitmap indicates a portion of the metadata page the operation is not performed on.

5. The computer-implemented method of claim 1, further comprising:
   reconstructing the metadata page based upon, at least in part, the bitmap stored within the storage system.

6. A computer program product residing on a non-transitory computer readable medium having a plurality of instructions stored thereon which, when executed by a processor, cause the processor to perform operations comprising:
   identifying, via the computing device, an operation performed on a metadata page of a plurality of metadata pages within a storage system, wherein the operation includes merging a child metadata page and a parent metadata page of a snapshot;
   generating a bitmap indicating one or more portions of a plurality of portions of the metadata page the operation is performed on, wherein the bitmap indicates one or more portions of the plurality of portions of the child metadata page changed from a data copy indicator to a data source indicator; and
   storing the bitmap within the storage system.

7. The computer program product of claim 6, wherein the bitmap is generated for each type of operation performed on the metadata page.

8. The computer program product of claim 6, wherein each bit of the bitmap indicates a portion of the metadata page the operation is performed on.

9. The computer program product of claim 6, wherein each bit of the bitmap indicates a portion of the metadata page the operation is not performed on.

10. The computer program product of claim 6, wherein the operations further comprise:
    reconstructing the metadata page based upon, at least in part, the bitmap stored within the storage system.

11. A computing system comprising:
    a memory; and
    a processor configured to identify an operation performed on a metadata page of a plurality of metadata pages within a storage system, wherein the operation includes merging a child metadata page and a parent metadata page of a snapshot, wherein the processor is further configured to generate a bitmap indicating one or more portions of a plurality of portions of the metadata page the operation is performed on, wherein the bitmap indicates one or more portions of the plurality of portions of the child metadata page changed from a data copy indicator to a data source indicator, and wherein the processor is further configured to store the bitmap within the storage system.

12. The computing system of claim 11, wherein the bitmap is generated for each type of operation performed on the metadata page.

13. The computing system of claim 11, wherein each bit of the bitmap indicates a portion of the metadata page the operation is performed on.

14. The computing system of claim 11, wherein each bit of the bitmap indicates a portion of the metadata page the operation is not performed on.

15. The computing system of claim 11, wherein the processor is further configured to:
    reconstruct the metadata page based upon, at least in part, the bitmap stored within the storage system.

* * * * *